US012346685B2

(12) United States Patent
Ishikawa et al.

(10) Patent No.: US 12,346,685 B2
(45) Date of Patent: *Jul. 1, 2025

(54) UPDATE CONTROL SYSTEM, UPDATE CONTROL METHOD, NON-TRANSITORY STORAGE MEDIUM, AND IN-VEHICLE CONTROL DEVICE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,714

(22) Filed: Nov. 16, 2023

(65) Prior Publication Data

US 2024/0086175 A1 Mar. 14, 2024

Related U.S. Application Data

(63) Continuation of application No. 17/659,396, filed on Apr. 15, 2022, now Pat. No. 11,861,354.

(30) Foreign Application Priority Data

Apr. 27, 2021 (JP) ................. 2021-074713

(51) Int. Cl.
*G06F 8/65* (2018.01)
*B60W 50/035* (2012.01)
(Continued)

(52) U.S. Cl.
CPC ............. *G06F 8/65* (2013.01); *B60W 50/035* (2013.01); *G07C 5/008* (2013.01); *H04W 4/48* (2018.02)

(58) Field of Classification Search
CPC .. G06F 8/60–66; B60W 50/035; G07C 5/008; H04W 4/44; H04W 4/48; H04L 67/125; H04L 67/12; H04L 67/34
(Continued)

(56) References Cited

U.S. PATENT DOCUMENTS

2013/0121502 A1  5/2013  Fuji
2021/0001792 A1  1/2021  Noda
2021/0182048 A1  6/2021  Harata et al.

FOREIGN PATENT DOCUMENTS

CN   111742293 A   10/2020
CN   112567337 A   3/2021
(Continued)

OTHER PUBLICATIONS

Kim, Taehyoung, et al., Compare of Vehicle Management over the Air and On-Board Diagnostics, International Symposium on Intelligent Signal Processing and Communication Systems (ISPACS), Dec. 2019, 2 pages, [retrieved on Apr. 4, 2025], Retrieved from the Internet: <URL:http://ieeexplore.ieee.org/>.*
(Continued)

*Primary Examiner* — Geoffrey R St Leger
(74) *Attorney, Agent, or Firm* — Oblon, McClelland, Maier & Neustadt, L.L.P.

(57) ABSTRACT

An update control system includes: a vehicle including an in-vehicle control device; an information processing terminal configured to communicate with the in-vehicle control device by wire communication; and a center configured to communicate with the in-vehicle control device over a wireless network. The in-vehicle control device is configured to: determine whether the vehicle is in a first state in which a wireless update process is possible or a second state in which a wired update process is possible; and when the state of the vehicle is switched between the first state and the second state after start and before completion of an update
(Continued)

process using a distribution package, carry over a progress of the update process performed until the state is switched; and perform the update process in the switched state.

20 Claims, 9 Drawing Sheets

(51) Int. Cl.
*G07C 5/00* (2006.01)
*H04W 4/48* (2018.01)

(58) Field of Classification Search
USPC .................................................. 717/168–178
See application file for complete search history.

(56) References Cited

FOREIGN PATENT DOCUMENTS

| | | | | |
|---|---|---|---|---|
| JP | 2019200789 A | * | 11/2019 | ............. G06F 8/654 |
| JP | 2020-4245 A | | 1/2020 | |
| JP | 2020-27621 A | | 2/2020 | |

OTHER PUBLICATIONS

Over-the-Air Update, Wikipedia, 2021, URL:https://en.wikipedia.org/w/index.php?title=Over-the-air_update&oldid=1019856787, retrieved Sep. 13, 2023.
Notice of Allowance dated Aug. 17, 2023, issued in corresponding U.S. Appl. No. 17/659,396.

* cited by examiner

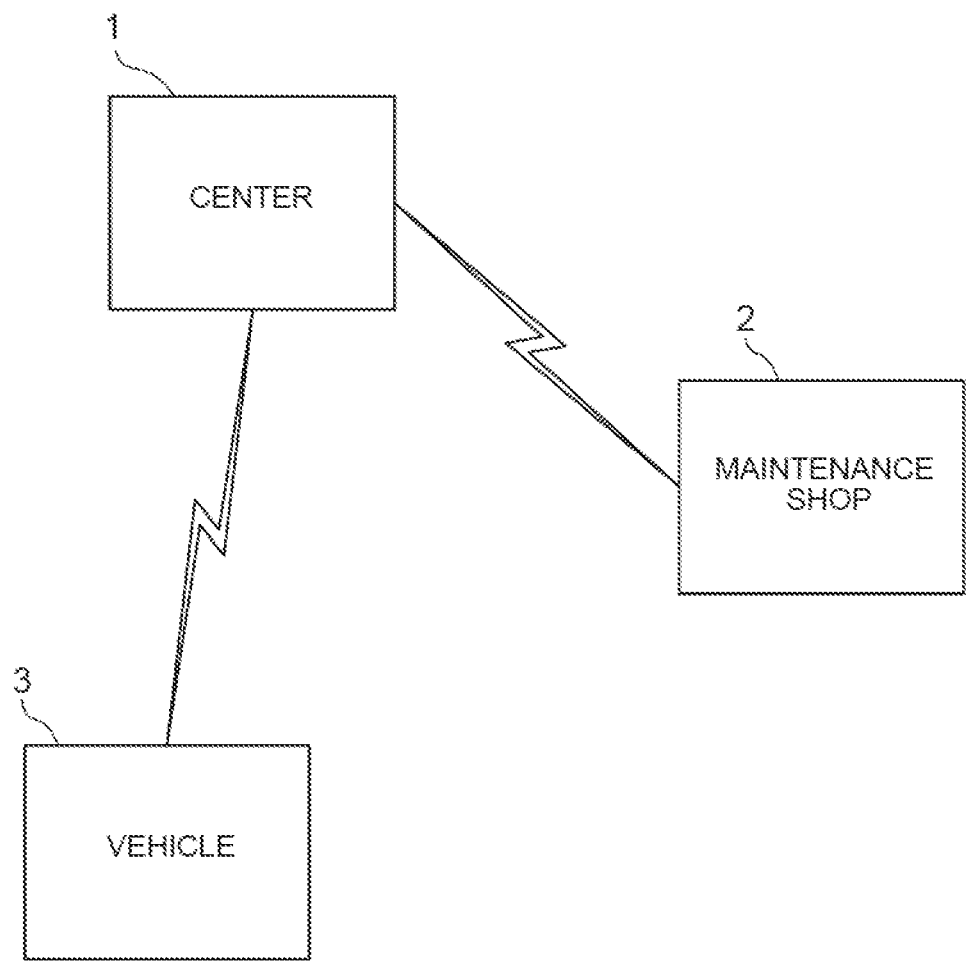
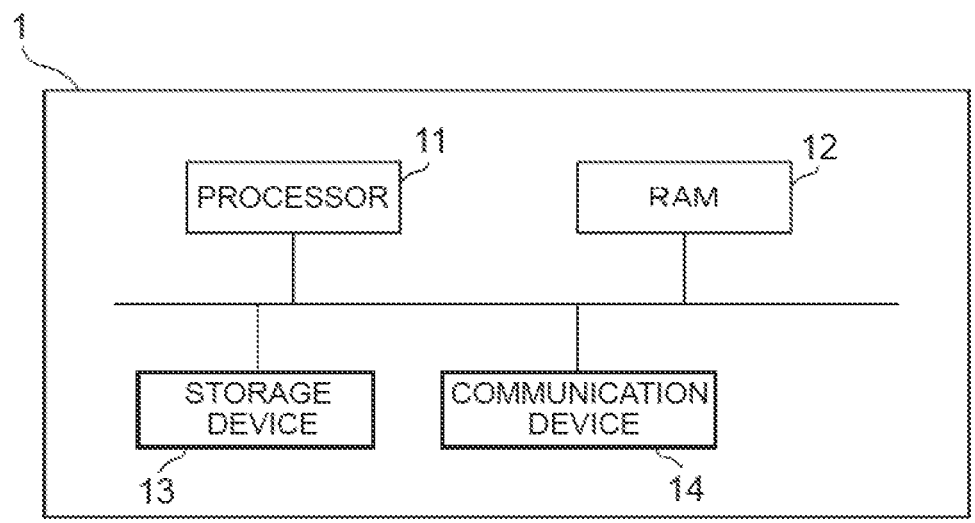

| VEHICLE IDENTIFICATION NUMBER | UPDATE HISTORY | UPDATE PROGRESS | ... |
|---|---|---|---|
| 1111111111 | .... | .... | ... |
| 2222222222 | .... | .... | ... |
| 3333333333 | .... | .... | ... |
| 4444444444 | .... | .... | ... |

UPDATE CONTROL SYSTEM, UPDATE CONTROL METHOD, NON-TRANSITORY STORAGE MEDIUM, AND IN-VEHICLE CONTROL DEVICE

CROSS-REFERENCE TO RELATED APPLICATION

This application is a continuation of U.S. application Ser. No. 17,659,396 filed Apr. 15, 2022, which claims priority to Japanese Patent Application No. 2021-074713 filed Apr. 27, 2021, each of which are incorporated herein by reference in its entirety.

BACKGROUND

1. Technical Field

The present disclosure relates to an update control system including: a vehicle including an in-vehicle control device configured to update software on one or more electronic control units; an information processing terminal configured to communicate with the in-vehicle control device by wired communication; and a center configured to communicate with the in-vehicle control device over a wireless network. The present disclosure also relates to an update control method, a non-transitory storage medium, and an in-vehicle control device.

2. Description of Related Art

Wired update and wireless update are known as methods for updating software on an electronic control unit (e.g., Japanese Unexamined Patent Application Publication No. 2020-004245 (JP 2020-004245 A)). In the wired update, the electronic control unit is brought to a maintenance shop and software on the electronic control unit is updated by wire. In the wireless update, the electronic control unit does not need to be brought to a maintenance shop. The electronic control unit communicates wirelessly with an update center, and software on the electronic control unit is updated from a remote location.

SUMMARY

For the wired update, communication can be expected to be stable as the update is performed by wire. However, it is necessary to bring the vehicle to a maintenance shop for the wired update. The user cannot use the vehicle while the vehicle is at the maintenance shop, which may reduce user convenience.

For the wireless update, on the other hand, the vehicle can download a distribution package that is a collection of update data, etc. regardless of the location of the vehicle while the user is using the vehicle, as long as the vehicle can communicate with the update center. However, wireless communication may become unstable. For example, communication may become unstable when the vehicle runs in a section where the vehicle cannot communicate with the update center.

The present disclosure discloses an update control system, an update control method, a non-transitory storage medium, and an in-vehicle control device that can reduce the time required to complete an update process related to a predetermined distribution package while ensuring user convenience from the start to the completion of the update process.

In a first aspect of a technique of the present disclosure, an update control system includes: a vehicle including an in-vehicle control device; an information processing terminal, and a center. The in-vehicle control device is configured to update software on one or more electronic control units. The in-vehicle control device is configured to determine whether the vehicle is in a first state in which a wireless update process is possible or a second state in which a wired update process is possible. The wireless update process is performed using a wireless network. The wired update process is performed using wired communication. The in-vehicle control device is configured to, when a state of the vehicle is switched between the first state and the second state after start of an update process using a distribution package and before completion of the update process, carry over a progress of the update process performed until the state is switched, and perform the update process in the switched state. The distribution package includes OTA data and wired update data. The OTA data is data to be used in the wireless update process. The wired update data is data to be used in the wired update process. The information processing terminal is configured to communicate with the in-vehicle control device by the wired communication. The center is configured to communicate with the in-vehicle control device over the wireless network. The center is configured to store the distribution package. The center is configured to send data included in the distribution package to the vehicle.

In the update control system according to the first aspect of the technique of the present disclosure, the in-vehicle control device may be configured to, when the state of the vehicle is switched between the first state and the second state, stop the update process performed in the state before the state of the vehicle is switched, and store progress data indicating a progress of the update process that is performed before the state of the vehicle is switched. The in-vehicle control device may be configured to, when the state of the vehicle is switched from the first state to the second state, perform the wired update process based on the stored progress data. The in-vehicle control device may be configured to, when the state of the vehicle is switched from the second state to the first state, perform the wireless update process based on the stored progress data. The center may be configured to send the OTA data when the vehicle is in the first state. The center may be configured to send the wired update data when the vehicle is in the second state.

In the update control system according to the first aspect of the technique of the present disclosure, the distribution package may further include common data that is used in both the wired update process and the wireless update process. The center may be configured to send the common data and the OTA data when the vehicle is in the first state. The center may be configured to send the common data and the wired update data when the vehicle is in the second state.

In a second aspect of the technique of the present disclosure, an update control method is performed by one or more computers of an update control system including a vehicle, an information processing terminal, and a center. The vehicle includes an in-vehicle control device configured to update software on one or more electronic control units. The information processing terminal is configured to communicate with the in-vehicle control device by wired communication. The center 1s configured to communicate with the in-vehicle control device over a wireless network. The update control method includes determining, by one or more computers of the in-vehicle control device, whether the vehicle is in a first state in which a wireless update process is possible or a second state in which a wired update process is possible. The wireless update process is performed using the wireless network. The wired update process is performed using the wired communication. The update control method includes, when a state of the vehicle is switched between the first state and the second state after start of an update process using a distribution package and before completion of the update process, carrying over a progress of the update process performed until the state is switched, and performing the update process in the switched state by the one or more computers of the in-vehicle control device. The distribution package includes OTA data and wired update data. The OTA data is data to be used in the wireless update process. The wired update data is data to be used in the wired update process. The update control method includes storing the distribution package by one or more computers of the center. The update control method includes sending data included in the distribution package to the vehicle by the one or more computers of the center.

In a third aspect of the technique of the present disclosure, a non-transitory storage medium stores instructions that are executable by one or more computers of an update control system and that cause the computer of the update control system to perform functions. The update control system includes a vehicle, an information processing terminal, and a center. The vehicle including an in-vehicle control device configured to update software on one or more electronic control units. The information processing terminal is configured to communicate with the in-vehicle control device by wired communication. The center is configured to communicate with the in-vehicle control device over a wireless network. The functions include determining by one or more computers of the in-vehicle control device whether the vehicle is in a first state in which a wireless update process is possible or a second state in which a wired update process is possible. The wireless update process is performed using the wireless network. The wired update process is performed using the wired communication. The functions include, when a state of the vehicle is switched between the first state and the second state after start of an update process using a distribution package and before completion of the update process, carrying over a progress of the update process performed until the state is switched, and performing the update process in the switched state by the one or more computers of the in-vehicle control device. The distribution package includes OTA data and wired update data. The OTA data is data to be used in the wireless update process. The wired update data is data to be used in the wired update process. The functions include storing the distribution package by one or more computers of the center. The functions include sending data included in the distribution package to the vehicle by the one or more computers of the center.

In a fourth aspect of the technique of the present disclosure, a vehicle control device includes one or more processors. The one or more processors are configured to connect to an in-vehicle network including one or more electronic control units. The one or more processors are configured to communicate with a center over a wireless network. The one or more processors are configured to communicate with an information processing terminal by wired communication. The one or more processors are configured to perform an update process of updating a program on the one or more electronic control units based on a distribution package received from the center. The one or more processors are configured to determine whether a vehicle is in a first state in which a wireless update process is possible or a second state in which a wired update process is possible. The wireless update process is performed using the wireless network. The wired update process is performed using the wired communication. The one or more processors are configured to, when a state of the vehicle is switched between the first state and the second state after start of a update process using the distribution package and before completion of the update process, carry over a progress of the update process performed until the state is switched, and perform the update process in the switched state. The distribution package includes OTA data and wired update data. The OTA data is data to be used in the wireless update process. The wired update data is data to be used in the wired update process.

According to the update control system the update control method, the non-transitory storage medium and the in-vehicle control device of the present disclosure, the time required to complete an update process can be reduced while ensuring user convenience.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a block diagram showing an overall configuration of a system according to an embodiment;

FIG. 2 is a block diagram showing a schematic configuration of a center 1;

DETAILED DESCRIPTION OF EMBODIMENTS

Figure 3:
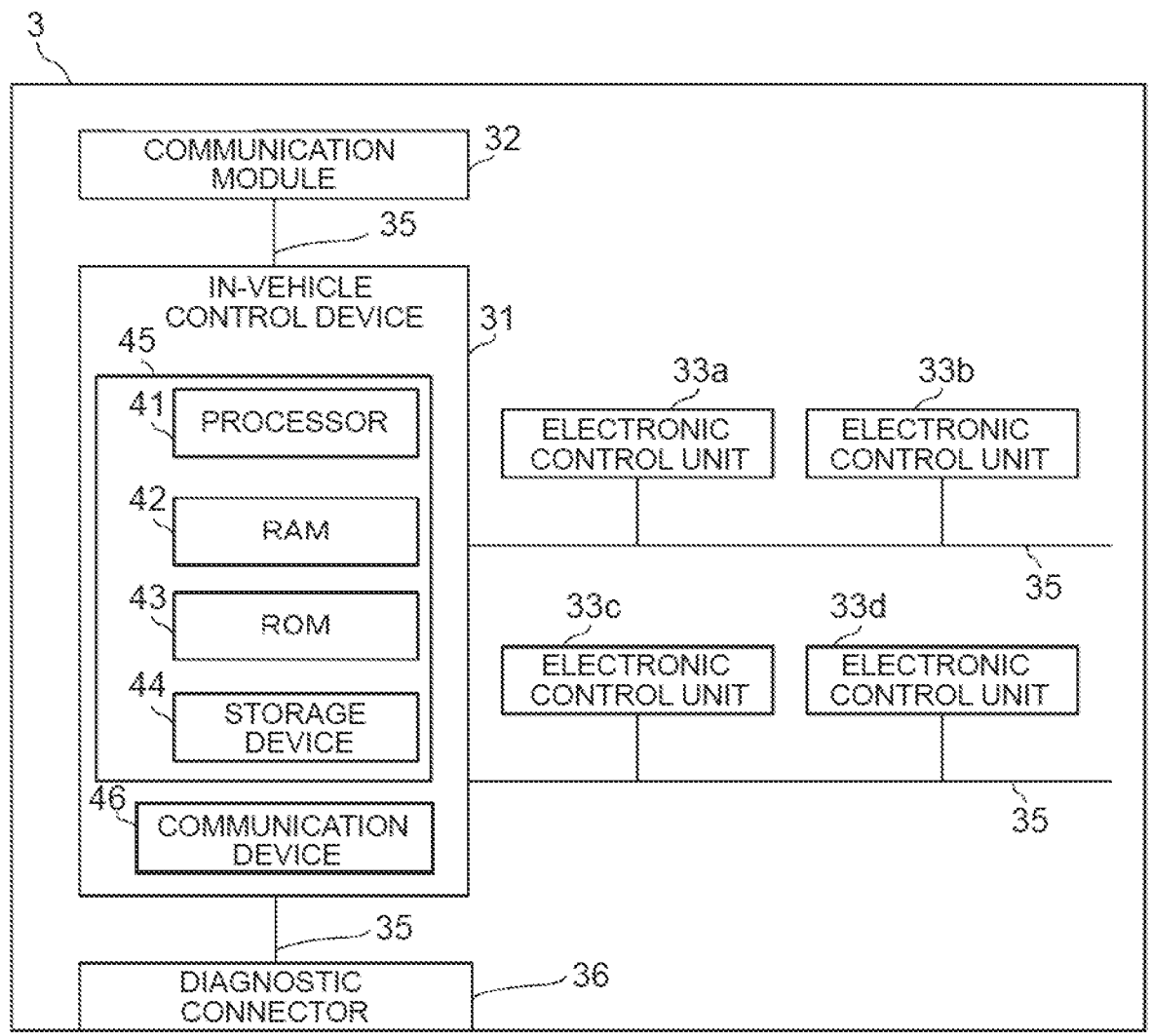
FIG. 3 is a block diagram showing a schematic configuration of a vehicle 3.

An embodiment of a technique of the present disclosure will be described in detail with reference to the drawings.
Overall Configuration of Update Control System The configuration of an update control system in the present disclosure will be described. FIG. 1 is a block diagram showing the overall configuration of the update control system. The update control system includes a center 1, a maintenance shop 2, and a vehicle 3.

The center 1 is a server that manages a software update on an electronic control unit in the vehicle 3 (to be more exact, the center 1 is a center system including such a server, but will be described as a server for convenience of description).

The center 1 can communicate wirelessly with the vehicle 3. The center 1 can communicate at least by wire (Internet, dedicated line, etc.) with the maintenance shop 2 (to be more exact, a predetermined server, information processing terminal, etc. of the maintenance shop 2).

The maintenance shop 2 is a facility for servicing the vehicle 3. The maintenance shop 2 has an in-house network to which an information processing terminal for maintenance work (hereinafter referred to as "maintenance work terminal"), not shown, is connected. The maintenance work terminal can communicate with the center 1 over the in-house network. The vehicle 3 brought to the maintenance shop 2 can be connected by wire to the in-house network or the maintenance work terminal to perform an update process of updating software on the electronic control unit of the vehicle 3, based on a predetermined operation by a service technician. Hereinafter, the update process that is performed in the wired environment at the maintenance shop 2 will be referred to as "wired update." In the present embodiment, the update process includes at least a sequence of "inquiring whether there is an update," a sequence of "downloading a distribution package," and a sequence of "writing update data."

The vehicle 3 can communicate wirelessly with the center 1. The vehicle 3 can perform the update process by using the wireless communication. Hereinafter, the update process using wireless communication between the vehicle 3 and the center 1 will be referred to as "wireless update" (a service that provides such a wireless update will be referred to as "over-the-air (OTA) service"). It is also possible to perform the wired update when the vehicle 3 is brought to the maintenance shop 2. In the following description, the state in which the vehicle 3 is not connected by wire and cannot perform the wired update but can perform the wireless update will be referred to as "first state." The state in which the vehicle 3 is connected by wire at the maintenance shop 2 and can perform the wired update will be referred to as "second state."

Configuration of Center 1

FIG. 2 is a block diagram showing a schematic configuration of the center 1. As shown in FIG. 2, the center 1 includes a processor 11, a random access memory (RAM) 12, a storage device 13, and a communication device 14. The storage device 13 includes a readable and writable storage medium such as a hard disk drive (HDD) or a solid state drive (SSD). The storage device 13 stores various kinds of programs and data necessary for processes according to the present embodiment. In the center 1, the processor 11 performs a predetermined control process by executing programs read from the storage device 13 using the RAM 12 as a work area. The communication device 14 communicates with the maintenance shop 2 and the vehicle 3 over a network.

Configuration of Vehicle 3

FIG. 3 is a block diagram showing a schematic configuration of the vehicle 3. As shown in FIG. 3, the vehicle 3 includes at least an in-vehicle control device 31, a communication module 32, a plurality of electronic control units (ECUs) 33a to 33d, and a diagnostic connector 36. The in-vehicle control device 31 is connected to the communication module 32, the electronic control units 33a to 33d, and the diagnostic connector 36 via a bus 35. The in-vehicle control device 31 can communicate wirelessly with the center 1 via the communication module 32. The in-vehicle control device 31 sends and receives predetermined data to and from the center 1 to perform control for a software update process on each electronic control unit 33a to 33d.

That is, the in-vehicle control device 31 has a software update function using the wireless update. The communication module 32 is communication equipment that can be connected wirelessly to a predetermined network (telephone network, Internet network, etc.). The in-vehicle control device 31 can also perform the wired update via the diagnostic connector 36 when the vehicle 3 is brought to the maintenance shop 2. That is, the in-vehicle control device 31 has a software update function using the wired update.

The in-vehicle control device 31 includes a microcomputer 45 and a communication device 46. The microcomputer 45 includes a processor 41, a RAM 42, a read-only memory (ROM) 43, and a storage device 44. In the in-vehicle control device 31, the processor 41 of the microcomputer 45 performs a predetermined process by executing programs read from the ROM 43 by using the RAM 42 as a work area. Specifically, the processor 41 performs a process related to the software update function using the wireless update or a process related to the software update function using the wired update. The communication device 46 communicates with the communication module 32, the electronic control units 33a to 33d, and the diagnostic connector 36 (the maintenance work terminal connected by wire to the diagnostic connector 36) via the bus 35.

The electronic control units 33a to 33d control the operation of various parts of the vehicle 3. The number of electronic control units shown in FIG. 3 is by way of example.

Functional Block Diagram of Center 1

Figure 4:
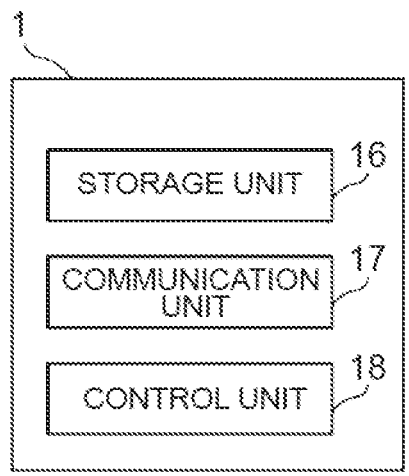
FIG. 4 is a functional block diagram of the center 1.

FIG. 4 is a functional block diagram of the center 1. The center 1 includes a storage unit 16, a communication unit 17, and a control unit 18. The communication unit 17 and the control unit 18 are implemented by the processor 11 shown in FIG. 2 executing programs stored in the storage device 13 by using the RAM 12. The storage unit 16 is implemented by the storage device 13 shown in FIG. 2.

The storage unit 16 stores programs and data to be used in the processes according to the present embodiment.

The control unit 18 sends and receives predetermined data to and from the in-vehicle control device 31 via the communication unit 17 to perform a process for the wireless update. The control unit 18 sends and receives predetermined data to and from the maintenance shop 2 via the communication unit 17 to perform a process for the wired update.

Functional Block Diagram of In-Vehicle Control Device 31

Figure 5:
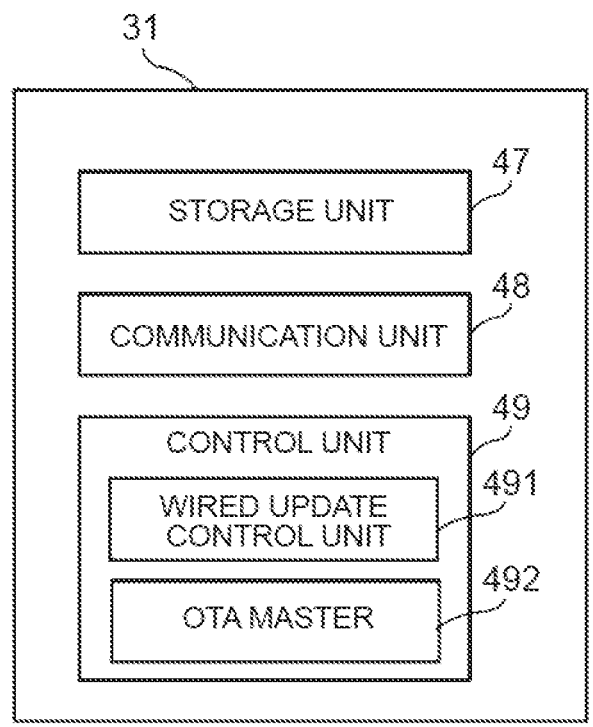
FIG. 5 is a functional block diagram of an in-vehicle control device 31.

FIG. 5 is a functional block diagram of the in-vehicle control device 31 shown in FIG. 3.

The in-vehicle control device 31 includes a storage unit 47, a communication unit 48, and a control unit 49. The storage unit 47 is implemented by the storage device 44 shown in FIG. 3. The communication unit 48 and the control unit 49 are implemented by the processor 41 shown in FIG. 3 executing programs stored in the ROM 43 by using the RAM 42.

The storage unit 47 stores various kinds of programs and data for execution of a software update process.

The control unit 49 includes a wired update control unit 491 and an OTA master 492. The wired update control unit 491 performs control for the wired update. The OTA master 492 performs control for the wireless update.

In the second state, the wired update control unit 491 performs the control for the wired update based on instructions (diagnostic communication command etc.) from the maintenance work terminal.

The forms of wired connection of the vehicle 3 at the maintenance shop 2 will be described. In the present embodiment, any form of connection may be used as long as the vehicle 3 (in-vehicle control device 31) is connected by wire at the maintenance shop 2 and can communicate with the center 1. For example, the following forms of connection are possible. The in-vehicle control device 31 may be connected to the in-house network of the maintenance shop 2 via the diagnostic connector 36. In this case, the control unit 49 receives instructions from the maintenance work terminal connected to the in-house network. Based on the received instructions, the control unit 49 communicates with the center 1 via the in-house network and performs a process for the wired update. For example, based on the instructions from the maintenance work terminal, the control unit 49 sends data for inquiring of the center 1 whether there is an update (hereinafter referred to as "update inquiry"). When there is an update, the control unit 49 downloads a distribution package (collection of update data, will be described in detail later) from the center 1. Based on the instructions from the maintenance work terminal, the control unit 49 also performs control to update software on a predetermined electronic control unit (one or more electronic control units out of the electronic control units 33a to 33d) using the downloaded distribution package. Alternatively, the maintenance work terminal may be directly connected to the in-vehicle control device 31 via the diagnostic connector 36. In this case, for example, mainly the maintenance work terminal proceeds with the update process. For example, the following processing is possible. Based on instructions from the maintenance work terminal, the control unit 49 sends information on the vehicle 3 such as configuration information of the vehicle 3 to the maintenance work terminal. The maintenance work terminal (instead of the control unit 49) makes an update inquiry together with the information to the center 1. When there is an update, the maintenance work terminal downloads a distribution package and sends the distribution package to the storage unit 47. Based on the instructions from the maintenance work terminal, the control unit 49 performs a process of updating software on a predetermined electronic control unit. Alternatively, when the maintenance work terminal is directly connected to the in-vehicle control device 31 via the diagnostic connector 36, the maintenance work terminal may serve as a repeater. That is, the maintenance work terminal connected by wire may relay communication between the control unit 49 and the center 1.

The form of wired connection of the vehicle 3 at the maintenance shop 2 is not limited to the above, and the vehicle 3 may be connected by wire in any form at the maintenance shop 2 as long as the control unit 49 can perform the wired update in the second state.

In the first state, the OTA master 492 communicates wirelessly with the center 1 via the communication unit 48 and performs various controls for the wireless update. Specifically, the control unit 49 makes an update inquiry to the center 1. When there is an update, the control unit 49 downloads a distribution package for the update from the center 1 by using wireless communication. The OTA master 492 updates software on an electronic control unit based on the downloaded distribution package.

In the present embodiment, the following control process is performed using the above configuration. When the state of the vehicle 3 is switched between the first state and the second state after the start of an update process for applying a predetermined distribution package and before completion of the update process, the vehicle 3 carries over the progress of the update process before the switching of the state and continues the update process in the switched state.

The processes according to the present embodiment will be described in detail.

Data for Use in Center 1

Figure 6:
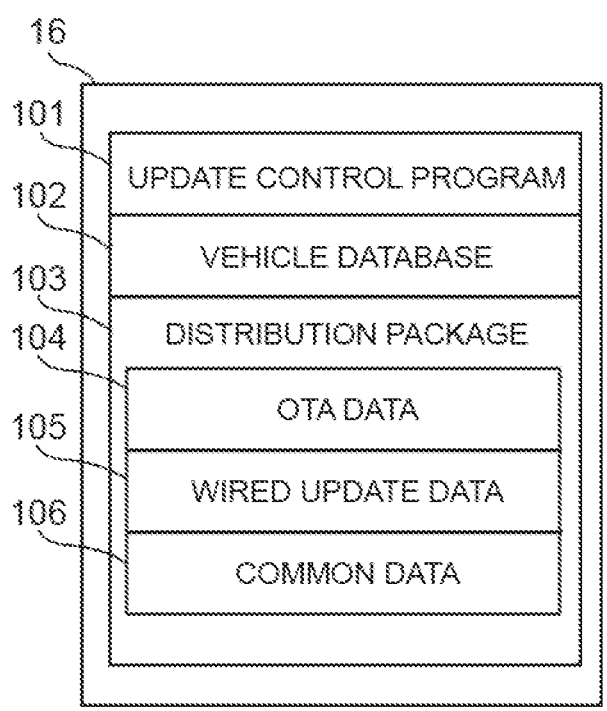
FIG. 6 is a memory map showing an example of data stored in a storage unit 16 of the center 1.

First, data to be used in the processes of the center 1 will be described. FIG. 6 is a memory map showing an example of data stored in the storage unit 16 of the center 1. The storage unit 16 stores an update control program 101, a vehicle database 102, and a distribution package 103. Although not shown in the figure, the storage unit 16 also stores various kinds of data required for an update control process as appropriate.

The update control program 101 is a program for controlling a process for software update according to the present embodiment in the center 1.

Figures 7, 8:
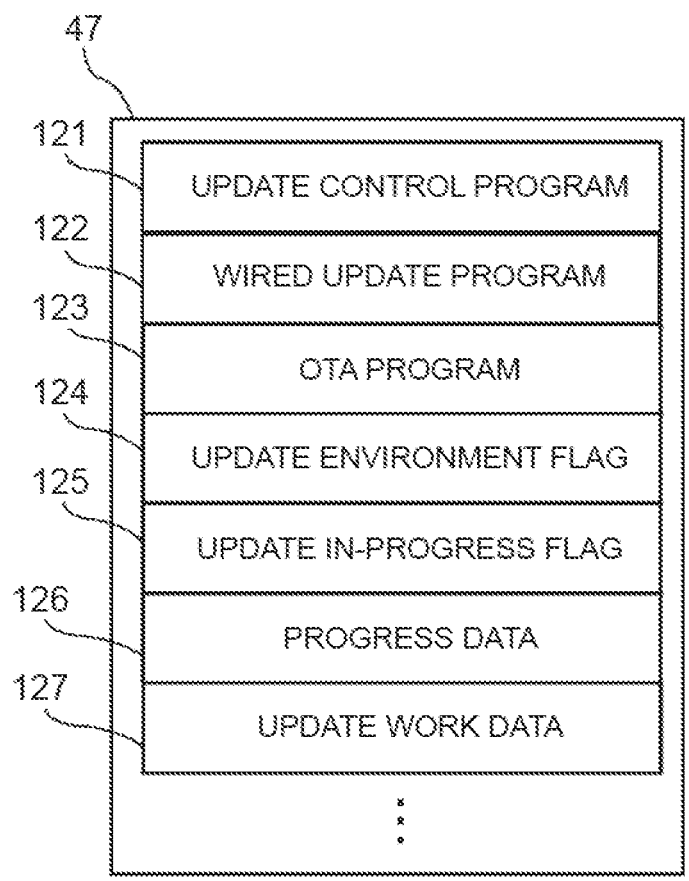
FIG. 7 shows an example of a data configuration of a vehicle database 102.
FIG. 8 is a memory map showing an example of data stored in a storage unit 47 of the in-vehicle control device 31.

The vehicle database 102 is a database of vehicles 3 whose update control is to be managed by the center 1. FIG. 7 shows an example of a data configuration of the vehicle database 102. The vehicle database 102 is a database including at least the following items: a vehicle identification number (VIN) 111, an update history 112, and an update progress 113. The vehicle identification number 111 is a unique number identifying each vehicle 3. The update history 112 is a record of a history of update processes that have been completed for a predetermined vehicle 3. The update history 112 is used to determine whether there is an update to be applied to the predetermined vehicle 3. The update progress 113 is data showing how much of an update process for applying a predetermined distribution package 103 to the predetermined vehicle 3 (that is, a single update process) has been completed. That is, the update progress 113 is data showing the progress of an update process of applying a certain distribution package 103 to the predetermined vehicle 3 after the start and before completion of the update process.

The distribution package 103 is a collection of update data for updating software on an electronic control unit. The distribution package 103 may include a plurality of pieces of update data for updating software on one or more electronic control units. In other words, it can be said that the distribution package 103 is a package of one or more pieces of update data. For example, when there are three electronic control units whose software is to be updated in a single update process (hereinafter referred to as "target ECUs"), update data for each of the target ECUs is collectively distributed as a single distribution package 103. The one or more target ECUs may function as the OTA master 492.

The distribution package 103 further includes three types of data: OTA data 104, wired update data 105, and common data 106. The OTA data 104 is data that is used only for the wireless update. The wired update data 105 is data that is used only for the wired update. For example, the OTA data 104 is predetermined update data processed into a format and content suitable for the wireless update. The wired update data 105 is predetermined update data processed into a format and content suitable for the wired update. The common data 106 is data that is used for both the wireless update and the wired update. Therefore, the content of the distribution package 103 that is sent to the vehicle 3 may vary depending on whether the vehicle 3 is in the first state or the second state. In other words, when the vehicle 3 is in the second state, the wired update data 105 and the common data 106 are sent to the vehicle 3, and a process for the wired update is performed using the wired update data 105 and the common data 106. When the vehicle 3 is in the first state, the OTA data 104 and the common data 106 are sent to the vehicle 3, and a process for the wireless update is performed using the OTA data 104 and the common data 106. Although only one distribution package 103 is shown in FIG. 6 for convenience of description, the storage unit 16 of the center 1 may store a plurality of the distribution packages 103.

Data for Use in In-Vehicle Control Device 31

Next, data to be used in the in-vehicle control device 31 will be described. FIG. 8 is a memory map showing an example of data stored in the storage unit 47 of the in-vehicle control device 31. The storage unit 47 of the in-vehicle control device 31 stores at least an update control program 121, a wired update program 122, an OTA program 123, an update environment flag 124, an update in-progress flag 125, progress data 126, and update work data 127.

The update control program 121 is a program to control the entire update control process according to the present embodiment in the in-vehicle control device 31. Specifically, the update control program 121 is a program to perform control to switch between the wired update program 122 and the OTA program 123 that will be described below, etc.

The wired update program 122 is a program to perform an update process for the wired update. The OTA program 123 is a program to perform an update process for the wireless update.

The update environment flag 124 is a flag to determine whether the vehicle 3 is in the first state or the second state.

The update in-progress flag 125 is a flag indicating whether an update process is currently in progress. In the present embodiment, the update in-progress flag 125 is set on when an update process of applying a predetermined distribution package 103 to a predetermined vehicle 3 is started, and is on until the update process is completed. The update in-progress flag 125 is set off (cleared) when the update process is completed. For example, the update in-progress flag 125 is set on when the distribution package 103 is being downloaded. Assuming that there are three target ECUs for the predetermined distribution package 103, the update in-progress flag 125 is set on when an update on two of the three target ECUs has been completed but an update on the remaining one has not been completed yet. The update in-progress flag 125 is set off when the update on all of the three target ECUs is completed.

The progress data 126 more specifically shows how much of an update process has been completed when the update process is in progress (the update in-progress flag 125 is on). For example, data indicating which sequence of the update process is currently being performed, how much data of the distribution package 103 has been downloaded when download of the distribution package 103 is not complete, and up to which memory block the update data has been written.

The update work data 127 is data that is temporarily stored for use in the update process. Specifically, the update work data 127 is a data including the distribution package 103 downloaded from the center 1.

Details of Process that is Performed by Control Unit 49 of Vehicle 3

Figure 9:
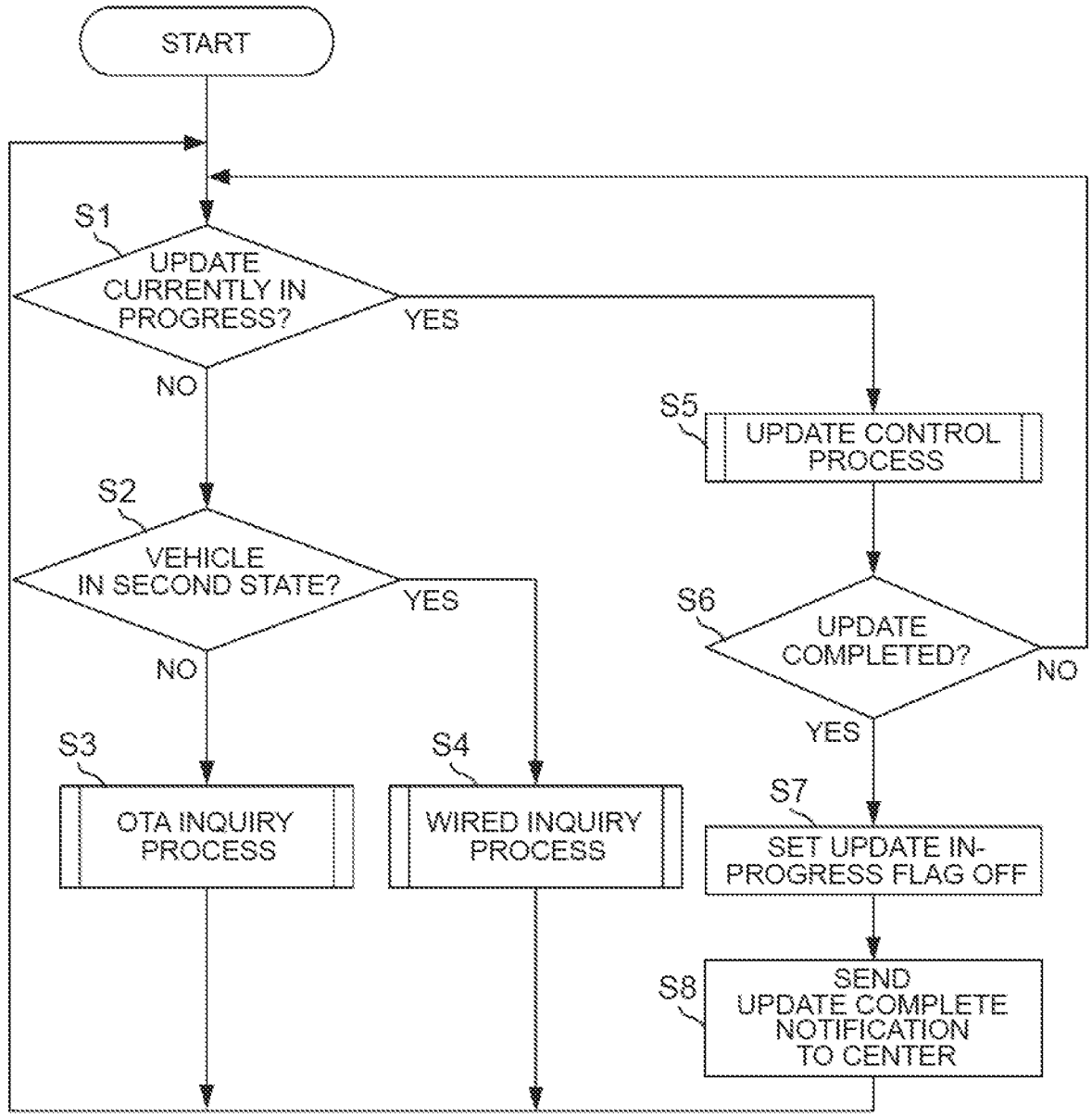
FIG. 9 is a flowchart showing details of a control process that is performed by the in-vehicle control device 31.

Next, a process that is performed by the control unit 49 of the vehicle 3 will be described. FIG. 9 is a flowchart showing details of a control process that is performed by the control unit 49 of the vehicle 3. In FIG. 9, in step S1, the control unit 49 refers to the update in-progress flag 125 and determines whether an update process is currently in progress. When the control unit 49 determines that the update process is not in progress (NO in step S1), the routine proceeds to step S2. In step S2, the control unit 49 determines whether the vehicle 3 is in the second state, that is, whether the vehicle 3 is in the state where the vehicle 3 can perform a wired update. For example, the control unit 49 makes this determination by detecting whether a predetermined cable is connected to the diagnostic connector 36. Alternatively, the control unit 49 may make this determination based on whether a diagnostic communication command is received (from the maintenance work terminal).

When the control unit 49 determines in step S2 that the vehicle 3 is not in the second state (NO in step S2), the routine proceeds to step S3. In step S3, the control unit 49 performs an OTA inquiry process. On the other hand, when the control unit 49 determines that the vehicle 3 is in the second state (YES in step S2), the routine proceeds to step S4. In step S4, the control unit 49 performs a wired inquiry process. Steps S3 and S4 will be described in detail.

Figure 10:
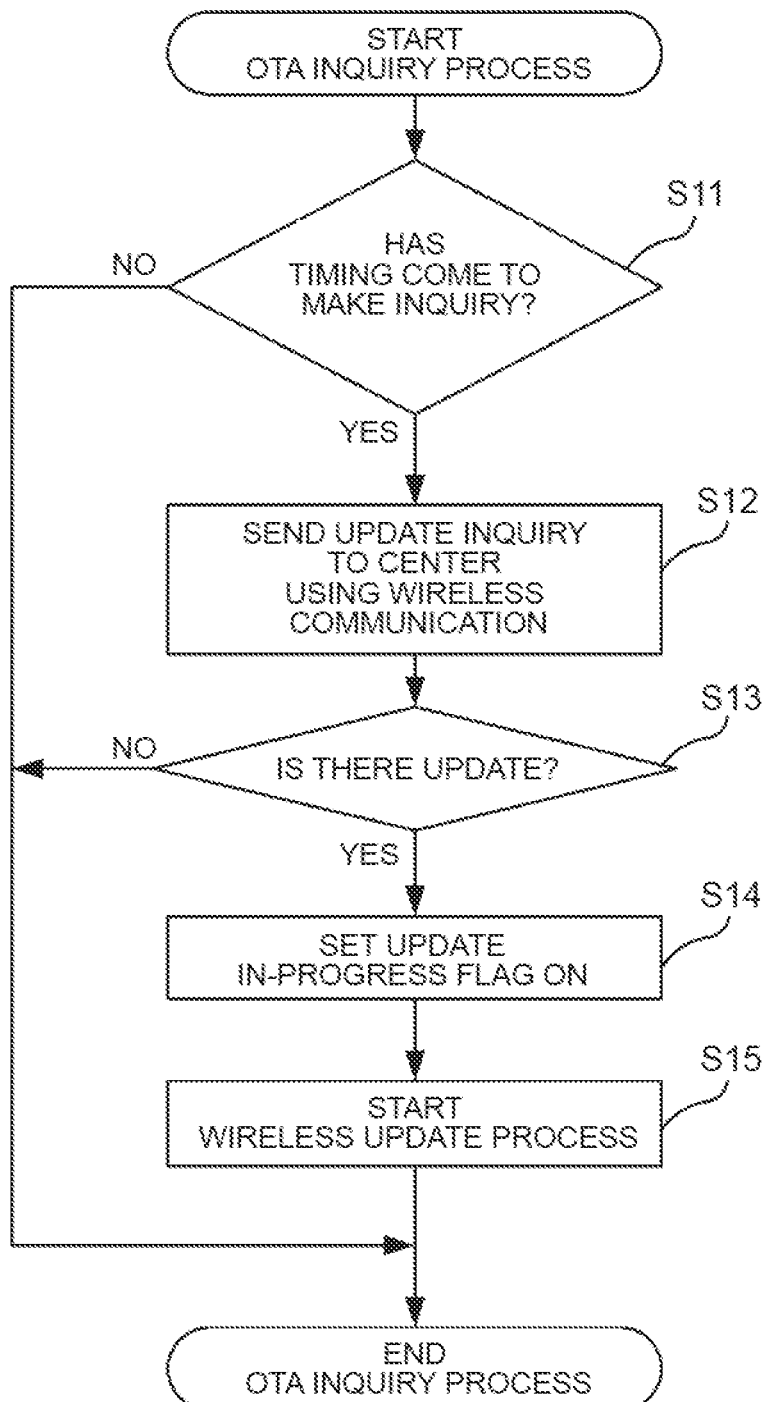
FIG. 10 is a flowchart showing details of an OTA inquiry process.

FIG. 10 is a flowchart showing details of the OTA inquiry process according to step S3. In this process, the control unit 49 performs a process of making an update inquiry to the center 1 (sequence of "inquiring whether there is an update") by using wireless communication. The control unit 49 executes the OTA program 123 for this process. The control unit 49 thus functions as the OTA master 492 in this process.

In FIG. 10, the OTA master 492 first determines in step S11 whether the timing has come to make an update inquiry. This timing may be any timing. In the present embodiment, an update inquiry is made every 10 days. Therefore, the OTA master 492 determines whether the timing has come to make an update inquiry by determining whether 10 or more days have passed since the previous update inquiry. When the OTA master 492 determines that the timing has not come to make an update inquiry (NO in step S11), the OTA master 492 ends the OTA inquiry process. On the other hand, when the OTA master 492 determines that the timing has come to make an update inquiry (YES in step S11), the routine proceeds to step S12. In step S12, the OTA master 492 sends an update inquiry to the center 1 by using wireless communication.

Next, in step S13, the OTA master 492 determines whether a response to the update inquiry that received from the center 1 indicates that there is an update. When the OTA master 492 determines that there is no update (NO in step S13), the OTA master 492 ends the OTA inquiry process. On the other hand, when the OTA master 492 determines that there is an update (YES in step S13), the routine proceeds to step S14. In step S14, the OTA master 492 sets the update in-progress flag 125 on. Thereafter, in step S15, the OTA master 492 starts a process for the wireless update. Specifically, the OTA master 492 starts the sequence of "downloading a distribution package." The OTA inquiry process is performed in the manner described above.

Figure 11:
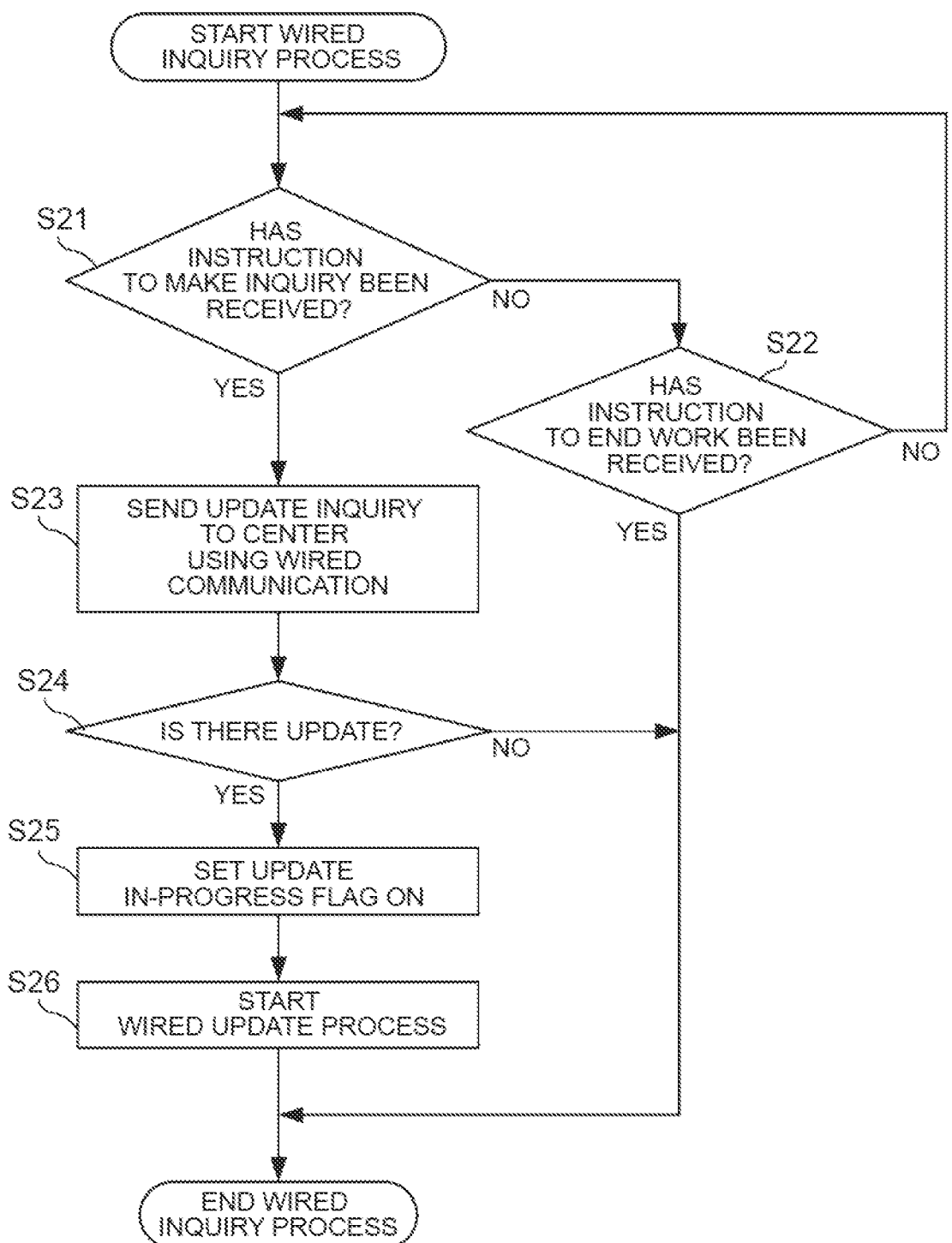
FIG. 11 is a flowchart showing details of a wired inquiry process.

FIG. 11 is a flowchart showing details of the wired inquiry process according to step S4. In this process, the control unit 49 performs a process of making an update inquiry to the center 1 by using wired communication. The control unit 49 executes the wired update program 122 for this process. The control unit 49 thus functions as the wired update control unit 491 in this process.

In FIG. 11, the wired update control unit 491 first determines in step S21 whether it has received an instruction to make an update inquiry from the maintenance work terminal. When the wired update control unit 491 determines that it has not received an instruction to make an update inquiry (NO in step S21), the routine proceeds to step S22. Next, the wired update control unit 491 determines in step S22 whether it has received an instruction to end the work by a service technician from the maintenance work terminal. When the wired update control unit 491 determines that it has received an instruction to end the work (YES in step S22), the wired update control unit 491 ends the wired inquiry process. On the other hand, when the wired update control unit 491 determines that it has not received an instruction to end the work (NO in step S22), the routine returns to step S21 and the wired update control unit 491 repeats the process.

On the other hand, when the wired update control unit 491 determines in step S21 that it has received an instruction to make an update inquiry from the maintenance work terminal (YES in step S21), the routine proceeds to step S23. In step S23, the wired update control unit 491 sends an update inquiry to the center 1 by using the wired communication. Thereafter, the wired update control unit 491 determines in step S24 whether a response to the update inquiry that is received from the center 1 indicates that there is an update. When the wired update control unit 491 determines that there is no update (NO in step S24), the wired update control unit 491 ends the wired inquiry process. On the other hand, when the wired update control unit 491 determines that there is an update (YES in step S24), the routine proceeds to step S25. In step S25, the wired update control unit 491 sets the update in-progress flag 125 on. Thereafter, in step S26, the wired update control unit 491 starts a process for the wired update. Specifically, the wired update control unit 491 starts the sequence of "downloading a distribution package." The wired inquiry process is performed in the manner described above.

Referring back to FIG. 9, a process that is performed by the control unit 49 when the control unit 49 determines that the update process is in progress in step S1 (YES in step S1) will be described. In this case, the control unit 49 performs an update control process in step S5. In this process, the control unit 49 performs a process of continuing either the process for the wired update or the process for the wireless update according to the state of the vehicle 3.

Figure 12:
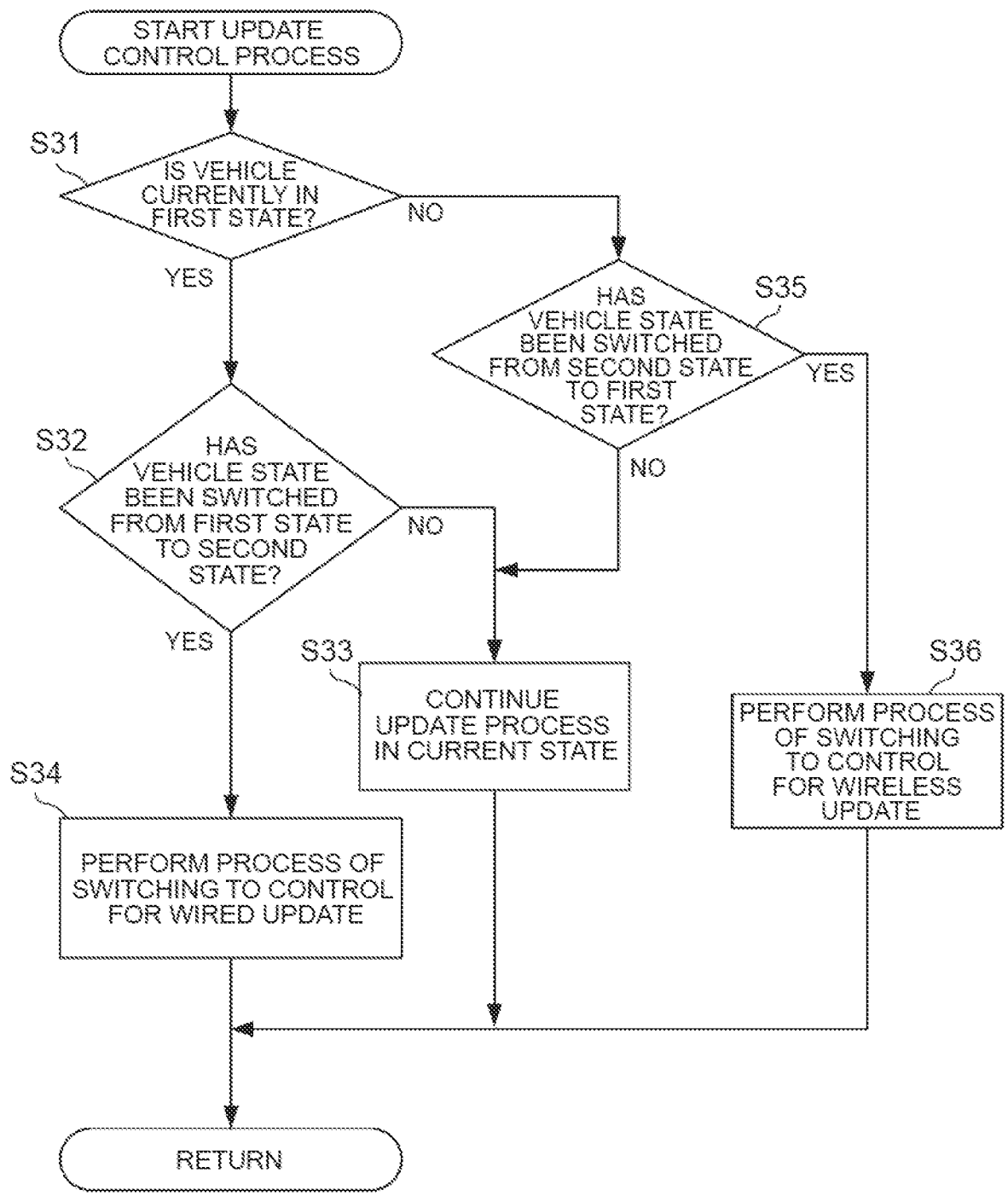
FIG. 12 is a flowchart showing details of an update control process.

FIG. 12 is a flowchart showing details of the update control process in step S5. In FIG. 12, in step S31, the control unit 49 refers to the update environment flag 124 and determines whether the vehicle 3 is currently in the first state. When the control unit 49 determines that the vehicle 3 is currently in the first state (YES in step S31), it can be said that the wireless update is in progress. In this case, the control unit 49 determines in step S32 whether the state of the vehicle 3 has been switched from the first state to the second state. For example, the control unit 49 determines that the state of the vehicle 3 has been switched from the first state to the second state when the control unit 49 detects connection of the predetermined cable to the diagnostic connector 36 or when the control unit 49 detects a reception of a diagnostic communication command sent from the maintenance work terminal.

When the control unit 49 determines in step S32 that the state of the vehicle 3 has been switched from the first state to the second state (YES in step S32), the routine proceeds to step S34. In step S34, the control unit 49 performs a process of switching the control for the update process from the control for the wireless update to the control for the wired update. For example, the following process is performed as this switching process. First, the control unit 49 generates data indicating the progress of the update process at that time, and stores the data in the storage unit 47 as the progress data 126. For example, this data is data indicating which sequence of the update process is currently being performed, or how much data of the distribution package 103 has been downloaded when download of the distribution package 103 is in progress. Next, the control unit 49 sends a switch notification indicating that the state of the vehicle 3 has been switched from the first state to the second state to the center 1 (in response to this notification, the center 1 performs control to change the content of the distribution package 103 to be sent from the center 1, etc.). The control unit 49 then switches the control program to be executed. Specifically, the control unit 49 ends the process based on the OTA program 123 currently being executed. Thereafter, the control unit 49 sets the update environment flag 124 to a value indicating that the vehicle 3 is in the second state. The control unit 49 also starts the wired update program 122. The control unit 49 then carries over the progress of the process for the wireless update and performs a process for the wired update, based on the progress data 126. That is, the control unit 49 resumes the update process in the wired update environment, based on the progress data 126. After then, the control unit 49 then ends the update control process.

This switching control need not necessarily be performed by the above method, and may be performed by any method as long as the control for the update process can be switched from the control for the wireless update to the control for the wired update so as to carry over the progress of the process for the wireless update.

When the control unit 49 determines that the state of the vehicle 3 has not been switched from the first state to the second state (NO in step S32), the control unit 49 continues the update process in the current environment in step S33. In this case, since the vehicle 3 is still in the first state, the control unit 49 continues the process for the wireless update. For example, when the control unit 49 has not finished the sequence of "downloading a distribution package," the control unit 49 continues the download process. When the control unit 49 finishes the sequence of "downloading a distribution package," the control unit 49 successively performs the sequence of "writing update data." In the process for the wireless update, the control unit 49 functions as the OTA master 492.

Next, a process when the control unit 49 determines in step S31 that the vehicle 3 is currently not in the first state (NO in step S31), will be described. In this case, it can be said that the process for the wired update is being performed. The control unit 49 determines in step S35 whether the state of the vehicle 3 has been switched from the second state to the first state. For example, the control unit 49 determines that the state of the vehicle 3 has been switched from the second state to the first state when the control unit 49 detects disconnection of the cable from the diagnostic connector 36 or when the control unit 49 detects a work end command sent from the maintenance work terminal.

When the control unit 49 determines in step S35 that the state of the vehicle 3 has been switched from the second state to the first state (YES in step S35), the routine proceeds to step S36. In step S36, the control unit 49 performs a process of switching the control for the update process from the control for the wired update to the control for the wireless update. For example, the following process is performed as this switching process. First, the control unit 49 generates data indicating the progress of the update process at that time, and stores the data in the storage unit 47 as the progress data 126. Next, the control unit 49 sends a switch notification indicating that the state of the vehicle 3 has been switched from the second state to the first state to the center 1. The control unit 49 then ends the process based on the wired update program 122 currently being executed. Thereafter, the control unit 49 sets a data indicating that the vehicle 3 is in the first state the update environment flag 124. The control unit 49 also starts the OTA program 123. The control unit 49 then carries over the progress of the process for the wired update and performs a process for the wireless update, based on the progress data 126. That is, the control unit 49 resumes the update process in the wireless update environment, based on the progress data 126.

This switching control need not necessarily be performed by the above method, and may be performed by any method as long as the control for the update process can be switched from the control for the wired update to the control for the wireless update so as to carry over the progress of the process for the wired update.

On the other hand, when the control unit 49 determines that the state of the vehicle 3 has not been switched from the second state to the first state (NO in step S35), the control unit 49 continues the update process in the current environment in step S33. In this case, since the vehicle 3 is still in the second state, the control unit 49 continues the process for the wired update. In the process for the wired update, the control unit 49 functions as the wired update control unit 491.

The update control process is performed in the manner described above.

Referring back to FIG. 9, the control unit 49 then determines in step S6 whether the update process for the wired update or the wireless update has been completed. When the update process has not been completed (NO in step S6), the routine returns to step S1 and the control unit 49 repeats the process. On the other hand, when the update process has been completed (YES in step S6), the control unit 49 sets the update in-progress flag 125 off in step S7. In the subsequent step S8, the control unit 49 sends an update complete notification indicating that the update process has been completed to the center 1. The routine then returns to step S1, and the control unit 49 repeats the process.

Process in Center 1

Figure 13:
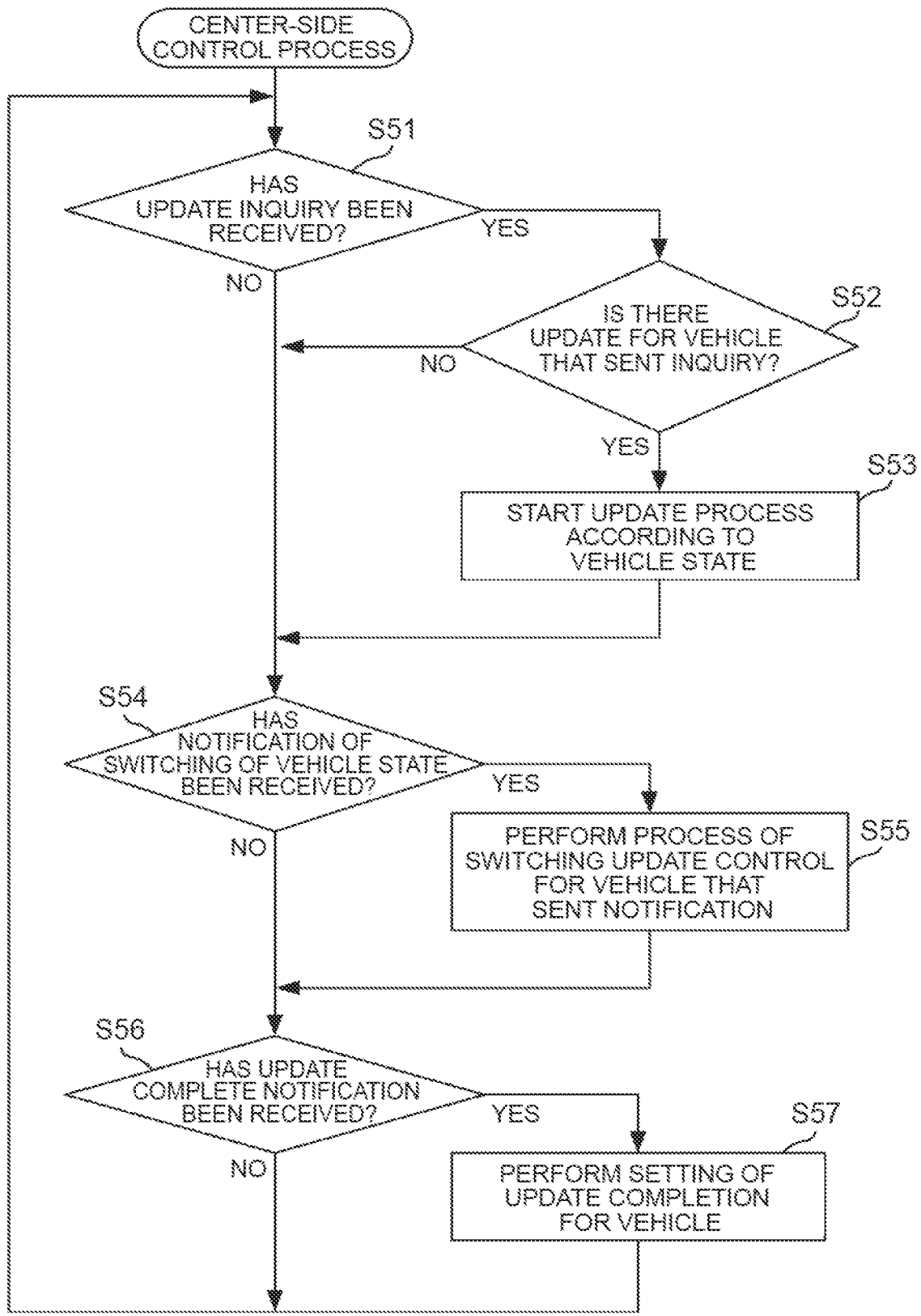
FIG. 13 is a flowchart showing details of a center-side control process that is performed by the center 1.

Next, a control process that is performed by the center 1 will be described. FIG. 13 is a flowchart showing details of a center-side control process that is performed by the center 1. In FIG. 13, the control unit 18 of the center 1 determines in step S51 whether the control unit 18 has received such an update inquiry as described above from a predetermined in-vehicle control device 31. When the control unit 18 determines that it has received an update inquiry (YES in step S51), the routine proceeds to step S52. In step S52, the control unit 18 determines whether there is an update to be applied (to be more exact, a distribution package 103 to be applied) to a vehicle 3 that sent the update inquiry. For example, the control unit 18 refers to the update history 112 of the vehicle database 102 and determines whether there is an update to be applied to this vehicle 3. When the control unit 18 determines that there is no update to be applied to this vehicle 3 (NO in step S52), the control unit 18 sends a signal indicating that there is no update to this vehicle 3, and then the routine then proceeds to step S54 that will be described later. On the other hand, when the control unit 18 determines that there is an update to be applied to this vehicle 3 (YES in step S52), the routine proceeds to step S53. In step S53, the control unit 18 sends a signal indicating that there is an update to this vehicle 3 that sent the update inquiry, and starts an update process according to the state of the vehicle 3 (first state or second state). The state of the vehicle 3 can be determined by the following method. For example, when the control unit 49 of the in-vehicle control device 31 makes an update inquiry, the control unit 49 may send data including information indicating the state of the vehicle 3 (own state) to the center 1. In this case, the control unit 18 of the center 1 determines the state of the vehicle 3 that sent the update inquiry, based on this information. When the control unit 18 determines that the vehicle 3 is in the first state, the control unit 18 determines that the wireless update is to be performed, and starts sending the OTA data 104 and the common data 106. On the other hand, when the control unit 18 determines that the vehicle 3 is in the second state, the control unit 18 determines that a wired update is to be performed, and starts sending the wired update data 105 and the common data 106.

Thereafter, the control unit 18 determines in step S54 whether it has received such a switch notification as described above from the predetermined in-vehicle control device 31. When the control unit 18 determines that it has received a switch notification (YES in step S54), the routine proceeds to step S55. In step S55, the control unit 18 performs a process of switching the update control for the vehicle 3 that sent the switch notification between the control for the wired update and the control for the wireless update. Specifically, the control unit 18 first stores in the update progress 113 the progress of the update process for the vehicle 3 that sent the switch notification. Next, the control unit 18 changes the content of the distribution package 103 to be sent according to the content of the switch notification. That is, when the switch notification indicates that the state of the vehicle 3 has been switched from the first state to the second state, the control unit 18 sends the wired update data 105 and the common data 106, or switches control so that a process for the wired update is performed. On the other hand, when the switch notification indicates that the state of the vehicle 3 has been switched from the second state to the first state, the control unit 18 sends the OTA data 104 and the common data 106, or switches control so that a process for the wireless update is performed. In addition, the control unit 18 performs a process of switching the control for the update process between the control for the wired update and the control for the wireless update according to the content of the switch notification. The control unit 18 then performs a process of checking the progress before the switching based on the update progress 113, carrying over this progress, and resuming the update process. The update process for the vehicle 3 that sent the switch notification is thus continued in the switched state.

On the other hand, when the control unit 18 determines in step S54 that it has not received a switch notification (NO in step S54), the routine proceeds to step S56. In step S56, the control unit 18 determines whether it has received an update complete notification from the predetermined vehicle 3. When the control unit 18 determines that it has received an update complete notification from the predetermined vehicle 3 (YES in step S56), the routine proceeds to step S57. In step S57, the control unit 18 performs setting indicating completion of the update process on the vehicle 3 that sent the update complete notification. Specifically, the control unit 18 sets information indicating "update complete" in the update progress 113. The control unit 18 also sets information on the update process completed this time in the update history 112. In addition, the control unit 18 performs a process of ending the update control for the vehicle 3 as appropriate. The routine then returns to step S51, and the control unit 18 repeats the process.

On the other hand, when the control unit 18 determines in step S56 that it has not received an update complete notification from the predetermined vehicle 3 (NO in step S56), step S57 is skipped. The routine then returns to step S51, and the control unit 18 repeats the process.

The center-side control process is performed in the manner described above.

As described above, in the present embodiment, even when the state of the vehicle 3 is switched between the first state in which the wireless update is possible and the second state in which the wired update is possible after the start and before completion of an update process for a predetermined distribution package 103, the progress of the update process before the switching can be carried over and the update process for the switched state can be continued. As long as the wireless update is possible, the distribution package 103 etc. can be downloaded at any place and while the vehicle 3 is being used. In the case of a wired update, the distribution package 103 can be downloaded etc. in a stable communication environment. Therefore, the time required to complete an update process can be reduced while ensuring user convenience.

Modifications

The above disclosure illustrates an example in which both the sequence of "downloading a distribution package" and the sequence of "writing update data" are performed in the second state in which a wired update is possible. In another embodiment, only the sequence of "downloading a distribution package" may be performed when the vehicle 3 is in the second state. That is, when the vehicle 3 is in the second state, only a process of downloading the distribution package 103 from the center 1 and storing the downloaded data in the storage unit 47 of the in-vehicle control device 31 may be performed at the maintenance shop 2. The sequence of "writing update data" may be performed when the vehicle 3 is in the first state after the vehicle 3 leaves the maintenance shop 2. Regarding the sequence of "downloading a distribution package," for example, the distribution package 103 may be downloaded in advance to the maintenance work terminal, and the distribution package 103 thus downloaded in advance may be transferred from the maintenance work terminal to the storage unit 47 as background processing while a process for the maintenance work other than the update process is being performed.

For the electronic control units that are target ECUs in the predetermined distribution package 103, the user may be able to designate for each electronic control unit whether to update the electronic control unit by the wireless update or the wired update. For example, it is assumed that target ECUs are three electronic control units A, B. and C. In such a case, when the user desires to complete an update process more reliably for the electronic control unit B, the user may be able to designate a wired update for the electronic control unit B and a wireless update for the other electronic control units by user setting. This configuration makes it possible for the user to have a service technician perform an update for the electronic control unit B at the maintenance shop 2 and to perform a wireless update on the other electronic control units, and thus can more flexibly meet user's needs.

Although one embodiment of the technique of the present disclosure is described above, the present disclosure can be interpreted not only as an update control system but also as an update control method that is performed by a computer of the update control system, a control program for the update control method, a computer-readable non-transitory storage medium storing the control program, an in-vehicle control device, etc. The update control system may include one or more computers. The in-vehicle control device may include one or more computers. The center may include one or more computers. The in-vehicle control device may include one or more processors.

The technique of the present disclosure can be used for a vehicle including an in-vehicle control device, an information processing terminal capable of communicating by wire with the vehicle, and an update control system including a center capable of communicating with the in-vehicle control device.

What is claimed is:

1. An in-vehicle control device comprising:
one or more processors configured to:
perform a wireless update process for updating a program of an electronic control unit mounted on a vehicle by using data received from a center via wireless communication, the data being included in a distribution package; and
carry over a progress of the wireless update process and perform a wired update process when the wired update process is started after start of the wireless update process and before completion of the wireless update process, the wired update process being a process for updating the program of the electronic control unit by using wired communication.

2. The in-vehicle control device according to claim 1, wherein the distribution package includes the data used in the wireless update process and data used in the wired update process.

3. The in-vehicle control device according to claim 1, wherein the one or more processors are configured to:
determine whether the one or more processors are able to perform the wired update process during the wireless update process; and
start the wired update process by carrying over the progress of the wireless update process when the one or more processors determine that the one or more processors are able to perform the wired update process.

4. The in-vehicle control device according to claim 1, wherein the one or more processors are configured to notify the center of a completion of updating the program of the electronic control unit when the wired update process is completed.

5. The in-vehicle control device according to claim 1, wherein the one or more processors are configured to end a progress of the wired update process and resume the wireless update process when the wireless update process is resumed during the wired update process.

6. The in-vehicle control device according to claim 1, wherein the one or more processors are configured to notify the center of a predetermined notification when the one or more processors switch from the wireless update process to the wired update process.

7. A vehicle comprising the in-vehicle control device according to claim 1.

8. A method comprising:
performing a wireless update process for updating a program of an electronic control unit mounted on a vehicle by using data received from a center via wireless communication, the data being included in a distribution package; and
carrying over a progress of the wireless update process and performing a wired update process when the wired update process is started after start of the wireless update process and before completion of the wireless update process, the wired update process being a process for updating the program of the electronic control unit by using wired communication.

9. The method according to claim 8, wherein the distribution package includes the data used in the wireless update process and data used in the wired update process.

10. The method according to claim 8, further comprising:
determining whether the wired update process is performable during the wireless update process; and starting the wired update process by carrying over the progress of the wireless update process when the wired update process is determined to be performable during the wireless update process.

11. The method according to claim 8, further comprising notifying the center of a completion of updating the program of the electronic control unit when the wired update process is completed.

12. The method according to claim 8, further comprising ending a progress of the wired update process and resuming the wireless update process when the wireless update process is resumed during the wired update process.

13. The method according to claim 8, further comprising notifying the center of a predetermined notification when the wireless update process is switched to the wired update process.

14. The method according to claim 8, wherein the method is performed by an in-vehicle device.

15. A non-transitory storage medium storing instructions that are executable by one or more processors and that cause the one or more processors to perform functions, the functions comprising:
   performing a wireless update process for updating a program of an electronic control unit mounted on a vehicle by using data received from a center via wireless communication, the data being included in a distribution package; and
   carrying over a progress of the wireless update process and performing a wired update process when the wired update process is started after start of the wireless update process and before completion of the wireless update process, the wired update process being a process for updating the program of the electronic control unit by using wired communication.

16. The non-transitory storage medium according to claim 15, wherein the distribution package includes the data used in the wireless update process and data used in the wired update process.

17. The non-transitory storage medium according to claim 15, wherein the functions further comprise:
   determining whether the wired update process is performable during the wireless update process; and
   starting the wired update process by carrying over the progress of the wireless update process when the wired update process is determined to be performable during the wireless update process.

18. The non-transitory storage medium according to claim 15, wherein the functions further comprise notifying the center of a completion of updating the program of the electronic control unit when the wired update process is completed.

19. The non-transitory storage medium according to claim 15, wherein the functions further comprise ending a progress of the wired update process and resuming the wireless update process when the wireless update process is resumed during the wired update process.

20. The non-transitory storage medium according to claim 15, wherein the functions further comprise notifying the center of a predetermined notification when the wireless update process is switched to the wired update process.

* * * * *